US012434947B2

(12) United States Patent
Inada et al.

(10) Patent No.: US 12,434,947 B2
(45) Date of Patent: Oct. 7, 2025

(54) HANDRAIL DEVICE AND WORK MACHINE COMPRISING SAME

(71) Applicant: KOBELCO CONSTRUCTION MACHINERY CO., LTD., Hiroshima (JP)

(72) Inventors: Keiko Inada, Hyogo (JP); Yasuo Ichikawa, Hyogo (JP); Tetsuya Kobatake, Hyogo (JP); Takuya Watanabe, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 885 days.

(21) Appl. No.: 17/641,006

(22) PCT Filed: Mar. 18, 2020

(86) PCT No.: PCT/JP2020/011915
§ 371 (c)(1),
(2) Date: Mar. 7, 2022

(87) PCT Pub. No.: WO2021/053863
PCT Pub. Date: Mar. 25, 2021

(65) Prior Publication Data
US 2022/0340399 A1 Oct. 27, 2022

(30) Foreign Application Priority Data
Sep. 20, 2019 (JP) ................................ 2019-171922

(51) Int. Cl.
*B66C 23/62* (2006.01)

(52) U.S. Cl.
CPC .................................. *B66C 23/62* (2013.01)

(58) Field of Classification Search
CPC ......... B66C 23/62; B66C 15/00; B66C 23/88; E04G 21/3223; E04G 5/14; E06C 7/183; E06C 5/04
See application file for complete search history.

(56) References Cited

U.S. PATENT DOCUMENTS 4,037,824 A * 7/1977 Whitmer ............ A62B 35/0087 256/53
5,029,670 A * 7/1991 Whitmer ............ A62B 35/0056 256/53

(Continued)

FOREIGN PATENT DOCUMENTS

DE 3214410 A1 * 10/1983
JP 51-163625 U 12/1976

(Continued)

OTHER PUBLICATIONS

Extended European Search Report issued Jul. 27, 2023, in corresponding European Patent Application No. 20865168.7, 10 pages.

(Continued)

*Primary Examiner* — Adriana Figueroa
(74) *Attorney, Agent, or Firm* — Oblon, McClelland, Maier & Neustadt, L.L.P.

(57) ABSTRACT

Provided is a handrail device in first and second unit booms adjacent to each other, having high strength. The handrail device includes: a pair of first poles; a pair of second poles; a first main rope stretched between the pair of first poles; a second safety line stretched between the pair of second poles; a first pole support member and a second pole support member that support the first poles and the second poles, respectively; first and second connection member; a first stay rope stretched between the first pole and the second connection member; and a second stay rope stretched between the second pole and the first connection member. The first pole support member and the first connection (Continued)

member are fixed to a common first fixation member, and a second pole support member and the second connection member are fixed to a common second fixation member.

10 Claims, 10 Drawing Sheets

(56) References Cited

U.S. PATENT DOCUMENTS

| | | | | | |
|---|---|---|---|---|---|
| 5,299,781 | A * | 4/1994 | Barrett | E01F 7/045 256/12.5 |
| 6,412,598 | B1 * | 7/2002 | Mackinnon | E04G 21/3261 182/4 |
| 10,233,601 | B2 * | 3/2019 | Gerrard | E04H 17/009 |
| 2004/0200668 | A1 * | 10/2004 | Duplessis | E04G 5/10 182/178.1 |
| 2008/0296546 | A1 * | 12/2008 | Bergendahl | E01F 15/065 256/13.1 |
| 2010/0243595 | A1 | 9/2010 | Walker et al. | |
| 2016/0376759 | A1 | 12/2016 | Gerrard et al. | |

FOREIGN PATENT DOCUMENTS

| | | | | | |
|---|---|---|---|---|---|
| JP | 63159192 | A | * | 7/1988 | |
| JP | 7-69585 | A | | 3/1995 | |
| JP | 08133671 | A | * | 5/1996 | |
| JP | 10120365 | A | * | 5/1998 | B66C 15/00 |
| JP | 2003137495 | A | * | 5/2003 | |
| JP | 2017-24889 | A | | 2/2017 | |
| JP | 2017024889 | A | * | 2/2017 | |
| WO | WO 2017/171394 | A1 | | 10/2017 | |

OTHER PUBLICATIONS

International Search Report issued Jun. 16, 2020 in PCT/JP2020/011915, filed on Mar. 18, 2020, 3 pages.

* cited by examiner

HANDRAIL DEVICE AND WORK MACHINE COMPRISING SAME

TECHNICAL FIELD

The invention relates to a handrail device to be provided to a boom of a work machine and a work machine including the same.

BACKGROUND ART

For transporting a large-sized work machine provided with a boom, such as a crawler crane, between sites or the like, the boom is disassembled into a plurality of unit booms to be transported and assembled at a transport destination. At that time, a worker walks on the boom that is fallen down on the ground.

In view of this, Patent Document 1 discloses a work scaffold device that is attached to the back surface of a boom. The work scaffold device includes a handrail including a plurality of poles and a main rope stretched between the poles, and the handrail is provided on the back surface of the boom that is being horizontally laid. The main rope and a worker are interconnected through a safety belt (safety rope), whereby the safety of the work is secured.

As for such a handrail as described above, the overseas standard requires the entire handrail to have so increased strength as to prevent a worker from falling down to the ground even in case where the safety rope is pulled by the worker who falls off. Adding many members for increasing the strength, however, involves remarkable increase in the mass and cost of the boom.

CITATION LIST

Patent Literature

Patent Literature 1: Japanese Unexamined Patent Publication No. Hei. 8-133671

SUMMARY OF INVENTION

The object of the invention is to provide a handrail device capable of having high strength without significantly increase in the mass of a boom and cost, and a work machine including the same.

Provided is a handrail device to be provided in a boom included in a work machine. The boom includes a plurality of unit booms to be connected to each other in a state of being aligned in a boom length direction that is a length direction of the boom, and the plurality of unit booms include a first unit boom and a second unit boom that are adjacent to each other in the boom length direction. Each of the first unit boom and the second unit boom includes a right support pillar and a left support pillar which are spaced in a boom width direction which is a width direction of the boom, the width direction being orthogonal to the boom length direction, each of the right support pillar and the left support pillar extending in the boom length direction, and a plurality of pipes which extend in the boom width direction between opposite ends of the right support pillar in the boom length direction and opposite ends of the left support pillar in the boom length direction, respectively, to interconnect the right support pillar and the left support pillar. The handrail device includes: a pair of first poles spaced in the boom length direction in the first unit boom and extending from the first unit boom in a pole direction orthogonal to each of the boom length direction and the boom width direction; a pair of second poles spaced in the boom length direction in the second unit boom and extending from the second unit boom in the pole direction; a first main rope stretched between the pair of first poles; a second main rope stretched between the pair of second poles; a first pole support member fixed to a first fixation member selected among the right support pillar, the left support pillar and the plurality of pipes of the first unit boom and supporting a first pole that is closer to the second unit boom among the pair of first poles; a second pole support member fixed to a second fixation member selected among the right support pillar, the left support pillar, and the plurality of pipes of the second unit boom and supporting a second pole that is closer to the first unit boom among the pair of second poles; a first connection member fixed to the first fixation member; a second connection member fixed to the second fixation member; a first stay rope stretched between the first pole supported by the first pole support member and the second connection member; and a second stay rope stretched between the second pole supported by the second pole support member and the first connection member.

BRIEF DESCRIPTION OF DRAWINGS

FIG. 3 is an enlarged perspective view of the part enclosed by a broken line III in

FIG. 2;

DESCRIPTION OF EMBODIMENTS

Hereinafter, there will be described preferred embodiments of the present invention with reference to the drawings.

Figure 1:
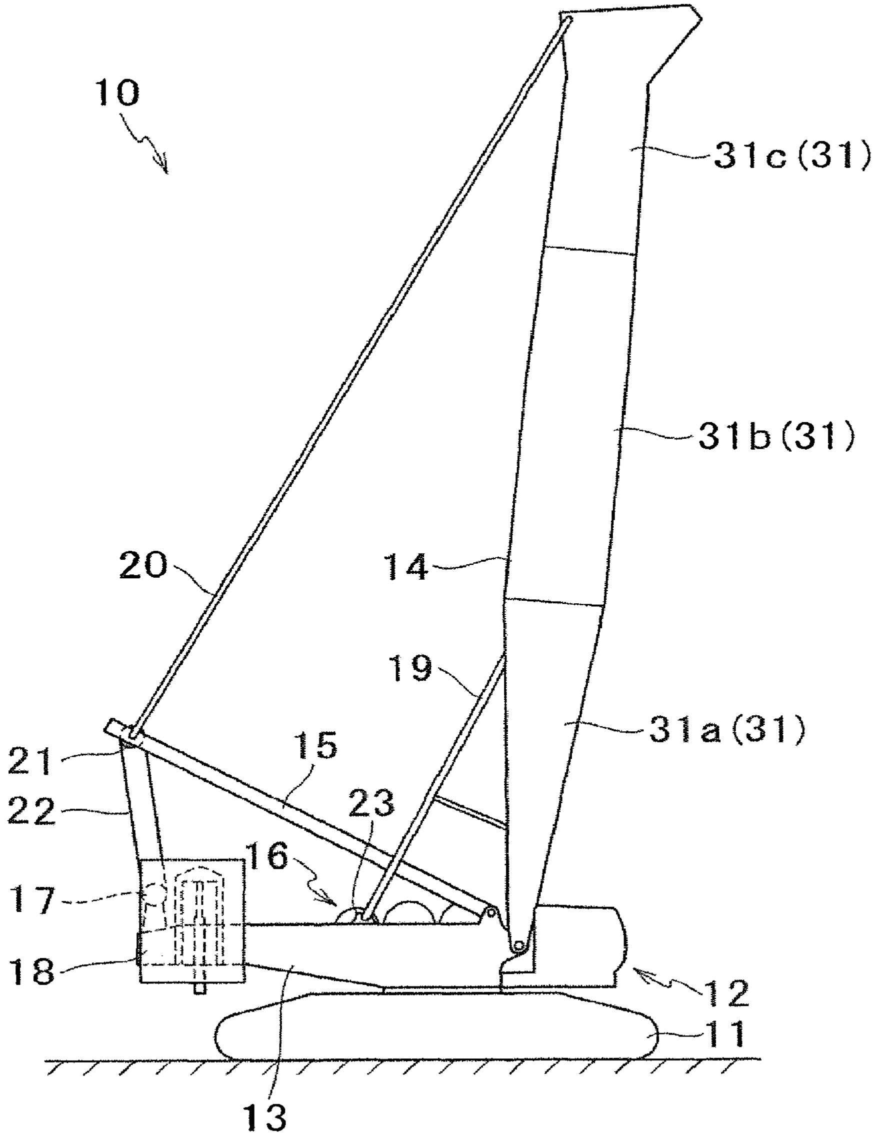
FIG. 1 is a side view of a crane as a work machine according to an embodiment of the present invention.

FIG. 1 is a side view showing a crane 10 as a work machine according to a first embodiment of the present invention. The crane 10 includes a crawler-type lower traveling body 11 and an upper turning body 12 turnably mounted on the lower traveling body 11. The right side of FIG. 1 corresponds to the front side of the crane 10 and the left side of FIG. 1 corresponds to the rear side of the crane 10. The work machine according to the present invention is not limited to a crawler type crane but allowed to be also, for example, a wheel type crane.

The upper turning body 12 includes a turning frame 13, a boom 14, a mast 15, a plurality of winch 16, a lower spreader 17, a counterweight 18, a backstop device 19, and an upper spreader 21.

The turning frame 13 is turnably mounted on the lower traveling body 11. The boom 14 is connected to a front part of the turning frame 13 capably of rising and falling to the turning frame 13. The boom 14 includes a plurality of unit booms 31, namely, a lower boom 31*a*, an intermediate boom 31*b*, and an upper boom 31*c*. The plurality of unit booms 31 are connected to each other in a boom length direction, which is the boom length direction of the boom 14, in a state of being aligned in the boom length direction, thereby constituting the boom 14. The specific number of the plurality of unit booms 31 is not limited. For example, the plurality of unit booms 31 may include a plurality of intermediate booms interposed between the lower boom 31*a* and the upper boom 31*c*.

The mast 15 is connected to the turning frame 13 capably of rising and falling thereto on the rear side of the boom 14. The mast 15 and the boom 14 have respective distal ends, which are interconnected through a guide link 20.

The plurality of winches 16 are arranged on the turning frame 13. Each of the plurality of winches 16 performs winding and unwinding a wire rope; thereby performed are lifting and lowering a suspended load, raising and lowering the boom 14, and the like.

The lower spreader 17 is disposed on a rear part of the turning frame 13. The upper spreader 21 is mounted on the distal end of the mast 15. The upper spreader 21 and the lower spreader 17 are interconnected through a boom raising and lowering rope 22. One of the plurality of winches 16 winds and unwinds the boom raising and lowering rope 22 to raise and lower the mast 15, thereby raising and lowering the boom 14.

The counterweight 18 is mounted on the rear part of the turning frame 13. The backstop device 19 is attached to the back surface of the boom 14 and extends from the back surface toward the turning frame 13. The backstop device 19 can be received by a backstop receiver 23 fixed to the turning frame 13 to thereby restrain the boom 14 from being inclined backward.

Figure 2:
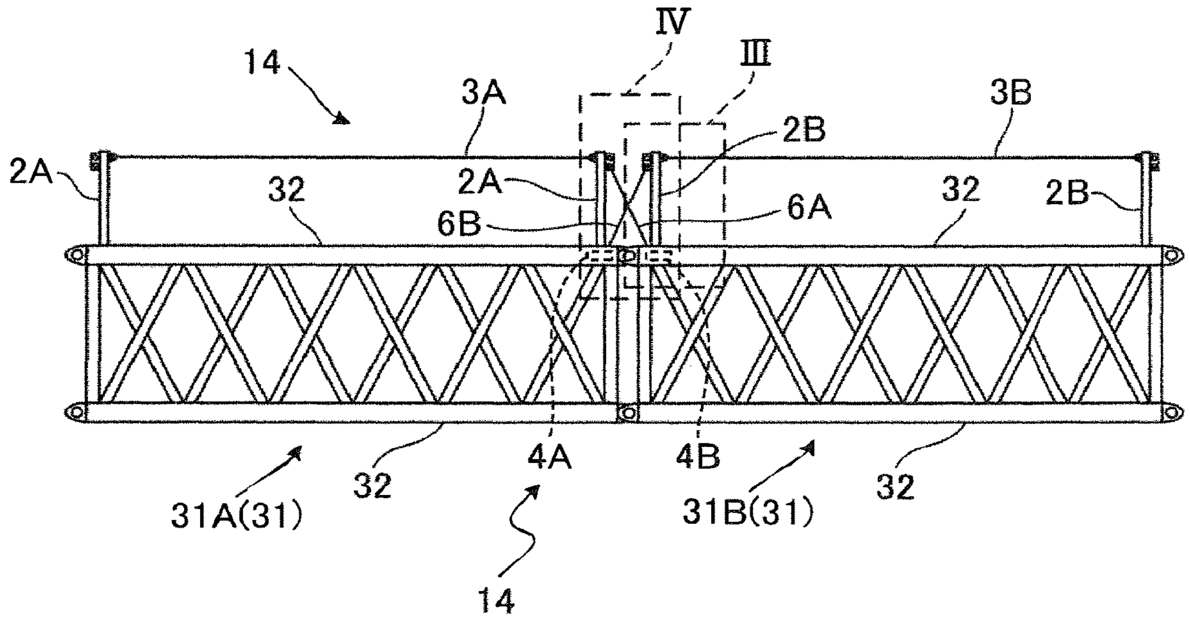
FIG. 2 is a side view showing a first unit boom and a second unit boom that constitute a boom in a horizontal posture in the crane according to the first embodiment.

The boom 14 is fallen down on the ground in order to perform assembling or disassembling the boom 14, that is, brought into a laid-down posture as shown in FIG. 2. To the upper surface of each of the plurality of unit booms 31 is attached a not-graphically-shown scaffold board. The scaffolding board serves as a scaffold for a worker who performs assembling or disassembling the boom 14, enabling the worker to perform interconnecting the plurality of unit booms 31 and feeding the wire rope for suspending the load from the winch 16 while moving on the scaffolding board.

Each of the plurality of unit booms 31 includes a plurality of support pillars 32 and a plurality of pipes 33.

The plurality of support pillars 32 include an upper right support pillar and an upper left support pillar disposed on a side close to the mast 15 (an upper side in FIG. 2), and a lower right support pillar and a lower left support pillar disposed on the side opposite thereto (the lower side in FIG. 2). Each of the plurality of support pillars 32 extends in the boom length direction. The upper right support pillar and the upper left support pillar are spaced in a boom width direction that is the width direction of the boom 14, the boom width direction being orthogonal to the boom length direction. Similarly, the lower right support pillar and the lower left support pillar are spaced in the boom width direction. In this embodiment, the upper right support pillar serves as a right support pillar according to the present invention, and the upper left support pillar serves as a left support pillar according to the present invention.

The plurality of pipes 33 are disposed at opposite ends, with respect to the boom length direction, of the plurality of unit booms 31, respectively. Each of the plurality of pipes 33 interconnects the support pillars adjacent to each other in the boom width direction out of the plurality of support pillars 32 (that is, interconnects the upper right support pillar and the upper left support pillar, and interconnects the lower right support pillar and the lower left support pillar).

Among the plurality of unit booms 31 selected are a first unit boom 31A and a second unit boom 31B which are shown in FIG. 2. The first and second unit booms 31A, 31B are unit booms adjacent to each other in the boom length direction out of the plurality of unit booms 31. The "plurality of unit booms" according to the present invention only has to include a first unit boom and a second unit boom, being permitted to include other unit booms than the first and second unit booms. In the boom 14 shown in FIG. 1, the lower boom 31*a* and the intermediate boom 31*b* can be selected as the first unit boom 31A and the second unit boom 31B, respectively, and the intermediate boom 31*b* and the upper boom 31*c* can be selected as the first unit boom 31A and the second unit boom 31B, respectively.

Figure 3:
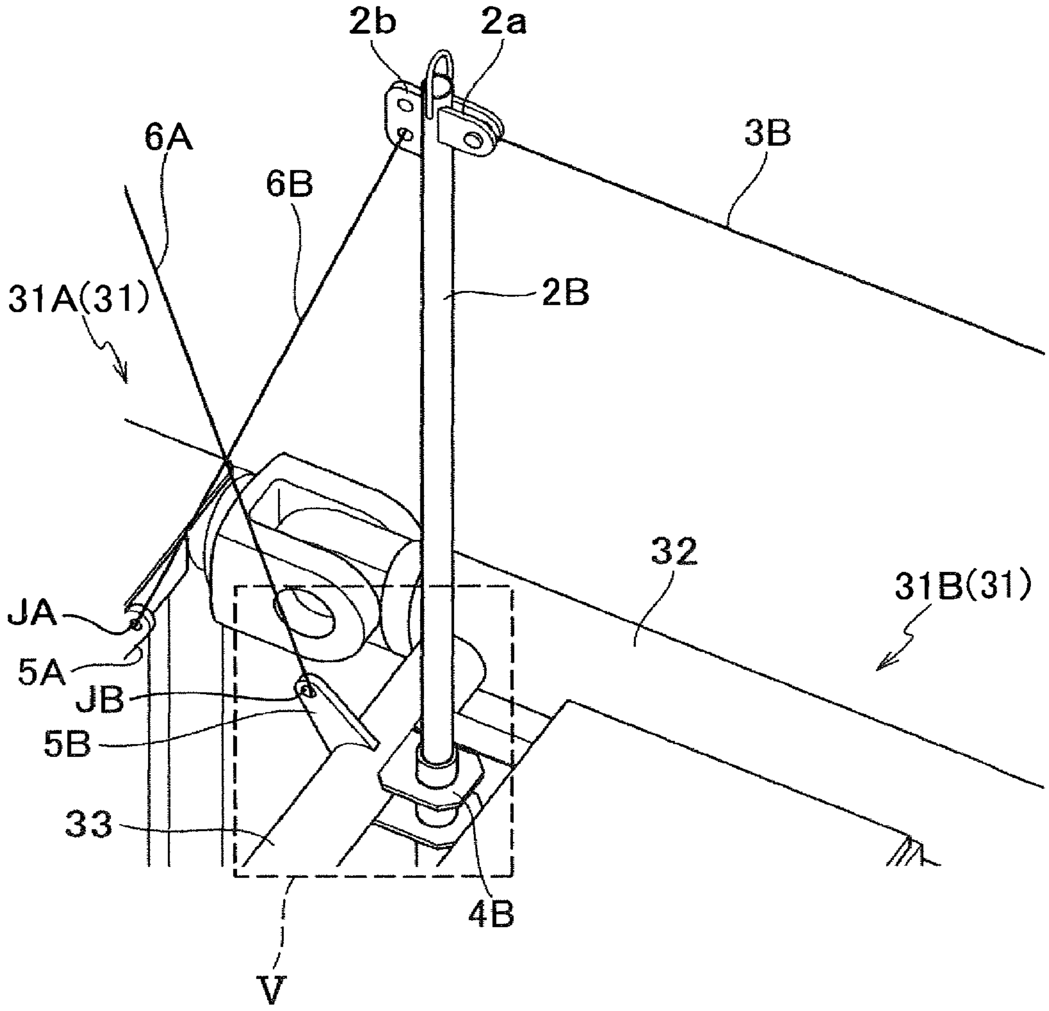

The handrail device 1 includes a pair of first poles 2A, a pair of second poles 2B, a first main rope 3A, a second main rope 3B, a first pole support member 4A, a second pole support member 4B, a first stay rope 6A and a second stay rope 6B, which are shown in FIG. 2, and a first connection member 5A and a second connection member 5B, which are shown in FIG. 3.

The pair of first poles 2A are spaced in the boom length direction of the first unit boom 31A. Specifically, the pair of first poles 2A extend in a pole direction from opposite ends, with respect to the boom length direction, of the first unit boom 31A, respectively. The pole direction is a direction orthogonal to each of the boom length direction and the boom width direction, being the vertical direction in FIG. 2. Similarly, the pair of second poles 2B are spaced in the boom length direction of the second unit boom 31B. Specifically, the pair of second poles 2B extend in the pole direction from opposite ends, with respect to the boom length direction, of the second unit boom 31B. The handrail device according to the present invention may include another pole that is disposed at a position different from that of the pair of first poles in the first unit boom, and, similarly, may include another pole that is disposed at a position different from that of the pair of second poles in the second unit boom.

The upper end of each of the pair of first poles 2A and the pair of second poles 2B includes a main-rope fastening part 2*a* and a stay-rope fastening part 2*b* as shown in FIG. 3, which illustrates a second pole 2B located at a position closer to the first unit boom 31 out of the first and second poles 2A, 2B. In the first unit boom 31A, one end of the first main rope 3A is fastened to the main-rope fastening part 2*a* and one end of the first stay rope 6A is fastened to the stay-rope fastening part 2*b*. Similarly, in the second unit boom 31B, one end of the second main rope 3B is fastened to the main-rope fastening part 2*a*, and one end of the second stay rope 6B is fastened to the stay-rope fastening part 2*b*.

As shown in FIG. 2, the first main rope 3A is stretched between respective main-rope fastening parts 2*a* of the pair of first poles 2A in the first unit boom 31A, and the second main rope 3B is stretched between respective main-rope fastening parts 2*a* of the pair of second poles 2B in the second unit boom 31B. The first and second main ropes 3A and 3B and an operator are connected through a not-graphically-shown safety belt (a lifeline). The first and second main ropes 3A, 3B are stretched between the pair of first poles 2A and between the pair of second poles 2B, respectively, during assembly work or disassembly work of the boom 14, and removed during crane work.

The first pole support member 4A is fixed to the first fixation member, and the second pole support member 4B is fixed to the second fixation member. The first fixation member is a member selected among the members that constitute the first unit boom 31A, the members including the plurality of support pillars 32 and the plurality of pipes 33, and the second fixation member is a member selected among the members that constitute the second unit boom 31B, the members including the plurality of support pillars 32 and the plurality of pipes 33. According to the example shown in FIG. 3, the pipe 33 on the side close to the first unit boom 31A, out of the plurality of pipes 33 of the second unit boom 31B, is selected as the second fixation member, to which the second pole support member 4B is fixed by bolts or welding.

The first pole support member 4A supports the first pole 2A on the side close to the second unit boom 31B (the right side in FIG. 2), out of the pair of first poles 2A, so as to allow the first pole 2A to move between a use position and a storage position, and the second pole support member 4B supports the second pole 2B on the side close to the first unit boom 31A (the left side in FIG. 2), out of the pair of second poles 2B, so as to allow the second pole 2B to move between the use position and the storage position (for example, slidably along the pole direction). Each of the first and second poles 2A, 2B protrudes upward (that is, in the pole direction) beyond the upper support pillar out of the plurality of support pillars 32 as shown in FIG. 2 at the use position. The storage position is a position where the first and second poles 2A, 2B are retracted downward from the use position, for example, a position where the upper end of each of the first and second poles 2A, 2B is close to the support pillar 32 on the upper side. Each of the first and second poles 2A, 2B supported by the first and second pole support members 4A, 4B, respectively, is located at the use position during assembly work or disassembly work of the boom 14, and located at the storage position during crane work.

The first connection member 5A is fixed to the first fixation member in the first unit boom 31A by bolts or welding. Similarly, the second connection member 5B is fixed to the second fixation member in the second unit boom 31B, namely, the pipe 33 in the example shown in FIG. 3. In the first embodiment, the first and second connection members 5A, 5B are disposed on the side closer to respective ends of the first and second unit booms 31A, 31B than the first and second pole support members 4A, 4B, with respect to the boom length direction (on the left side in FIG. 3), respectively.

The first stay rope 6A is stretched between the stay-rope fastening part 2*b* of the first pole 2A supported by the first pole support member 4A and the second connection member 5B. The second stay rope 6B is stretched between the stay-rope fastening part 2*b* of the second pole 2B supported by the second pole support member 4B and the first connection member 5A. The first and second stay ropes 6A, 6B are stretched as described above at the time of assembling work or disassembling work of the boom 14, and removed during crane work.

Fixing the pole support member 4A for supporting the first pole 2A and the first connection member 5A to which the second stay rope 6B is connected to the common first fixation member, and fixing the pole support member 4B for supporting the second pole 2B and the first connection member 5A to which the second stay rope 6B is connected to the common first fixation member, namely, the pipe 33 in the example shown in FIG. 3, enable the handrail device to include the reduced number of members that is required to have high strength in the handrail device 1. For example, the example shown in FIGS. 9 and 10 includes a dedicated pipe 34, which is attached to the unit boom 31 at a position different from that of the pipe 33 for interconnecting the support pillars 32, in order to fix the connection member 5, thereby increasing the number of members required to have sufficient strength. In contrast, the handrail device 1 according to the first embodiment can be given high strength without significant increase in the mass and cost of the boom 14. Restraining the mass of the boom 14 from increase enables the boom to have improved capacity of lifting the suspended load and enables the load for raising the boom 14 to be reduced.

Figure 4:
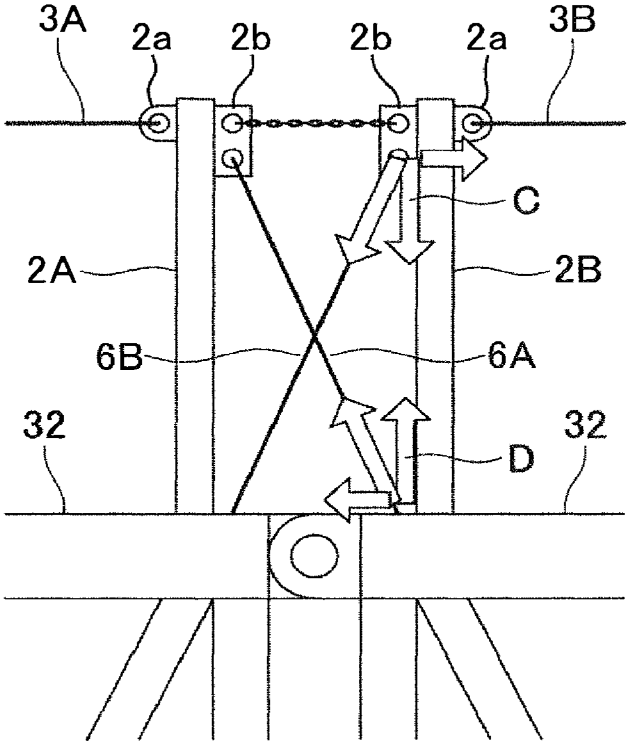
FIG. 4 is an enlarged side view of the part enclosed by a broken line IV in FIG.

Besides, the constitution of the handrail device 1 contributes to further improved safety. Even in case where workers simultaneously fall from the first and second unit booms 31A, 31B, respectively, to cause downward forces simultaneously to act on the first and second main ropes 3A, 3B, respectively, the force acting on the entire handrail device 1 can be reduced enough to allow each of the workers to be supported. That is because the first pole support member 4A and the first connection member 5A are fixed to the common first fixation member, and the second pole support member 4B and the second connection member 5B are fixed to the common second member, namely, the pipe 33 in an example shown in FIG. 3, which causes, for example, in the second unit boom 31B, as shown in FIG. 4, a force C acting on the second pole 2B in the direction from the upper end of the second pole 2B to the pipe 33, that is, downward, and the force D acting on the second connection member 5B in the direction from the pipe 33 to the upper end of the second pole 2B, that is, upward, to substantially cancel each other. This is the same for the first unit boom 31A.

For example, when a worker A falls from the first unit boom 31A to thereby cause the body weight thereof to act on the pair of first poles 2A through the first main rope 3A, the force due to the body weight is transmitted to the connection member 5B through the first stay rope 6A, and the vertical component of the tension of the first stay rope 6A at this time, that is, the force corresponding to the weight of the worker A, corresponds to the force acting on the second connection member 5B, namely, the force D. If a worker B falls from the second unit boom 31B at the same time, the force caused by the body weight is transmitted to the pair of second poles 2R through the second main rope 3B, and the tension of the second stay rope 6B at this time, that is, the force corresponding to the weight of the worker B is transmitted to the first connection member 5A, while the force of the weight of the worker B is applied to the pair of second poles 2B itself, and the vertical component of the force corresponds to the force C. Accordingly, if respective weights of the workers A and B are equal to each other, the forces C and D are equal to each other to be cancelled out, thus making the force acting on the second pole 2B remarkably reduced. For the same reason, the force acting on the first pole 2A is remarkably reduced.

Besides, as shown in FIG. 3, location of the second connection member 5B at the position closer to the end of the second unit boom 31B than the second pole support member 4B with respect to the boom length direction, that is, at a position closer to the first unit boom 31A, enables the first stay rope 6A and the second pole 2B to be easily prevented from interference with each other. Similarly, the location of the first connection member 5A at the position closer to the end of the first unit boom 31A in the boom length direction than the first pole support member 4A, that is, at the position closer to the second unit boom 31B, enables the second stay rope 6B and the first pole 2A to be easily prevented from interference with each other.

Figure 9:
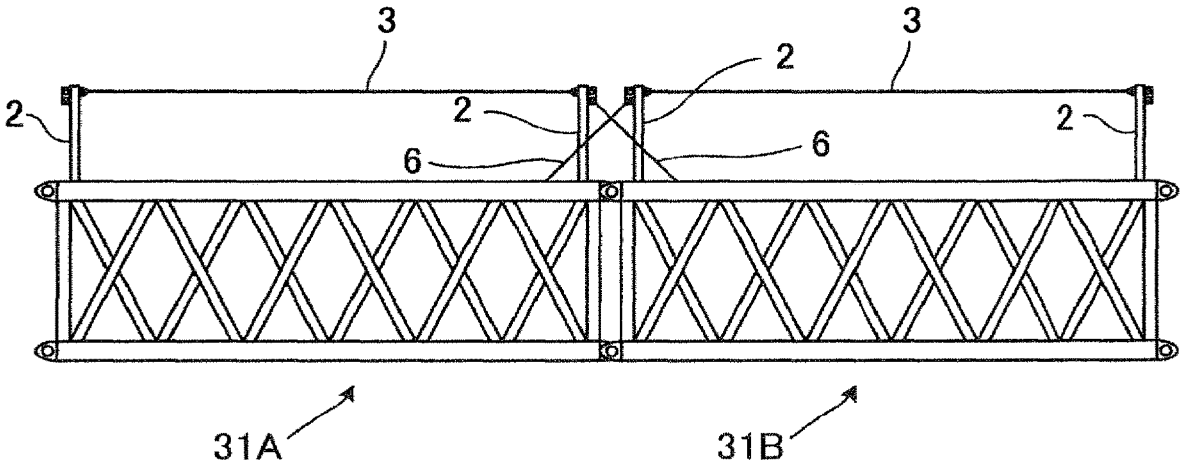
FIG. 9 is a side view showing first and second unit booms adjacent to each other in a reference example.
Figure 10:
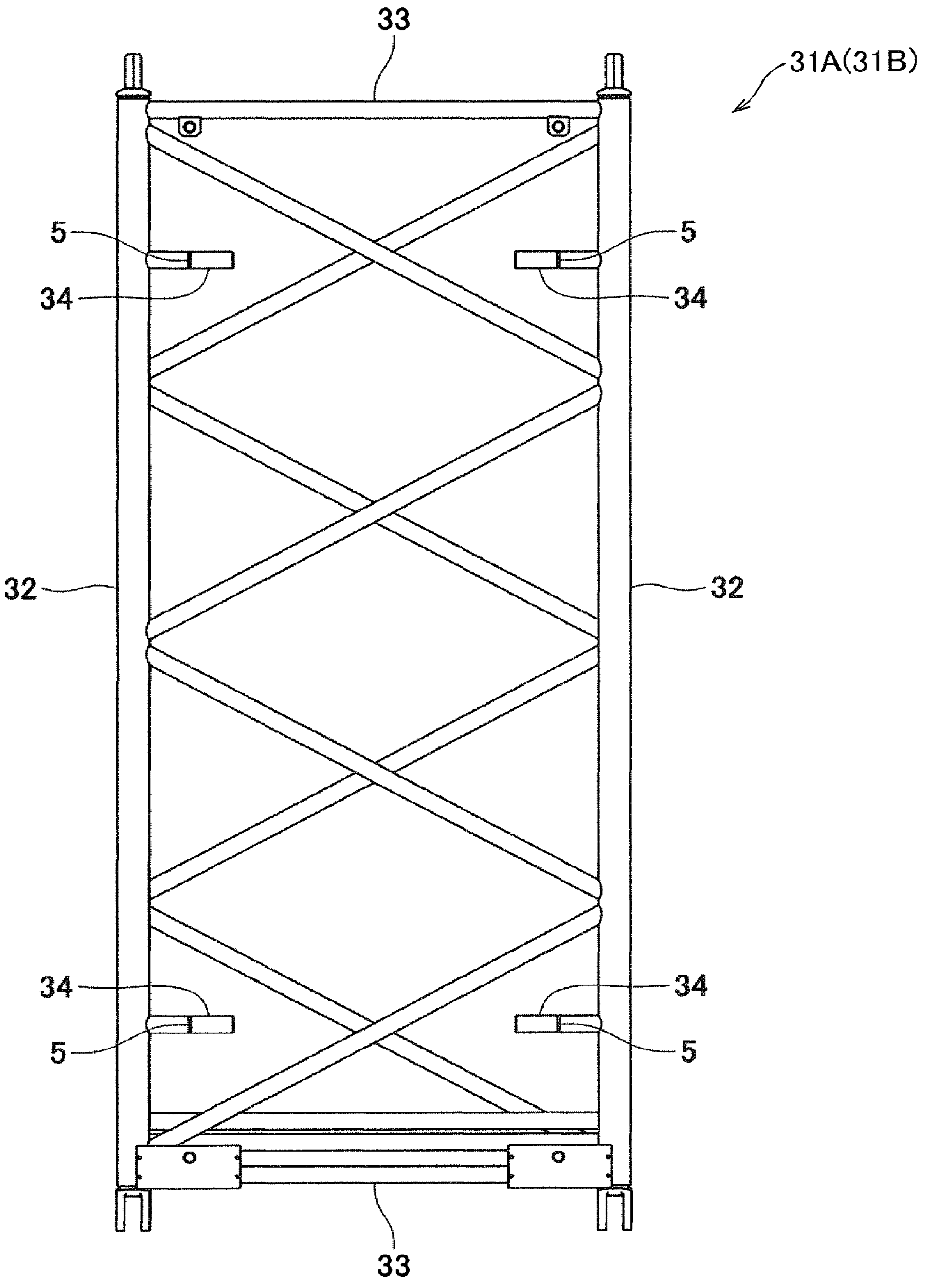
FIG. 10 is a plan view showing one of the first and second unit booms shown in FIG. 9.

The above-mentioned effects are described below in comparison with the reference example shown in FIGS. 9 and 10. In the reference example, a plurality of connection members 5 to which a stay rope 6 should be connected are fixed to a plurality of exclusive pipes 34, respectively, the pipes 34 attached to respective opposite ends of the unit booms 31 adjacent to each other. Each of the plurality of pipes 34 is disposed on the inner side of a pipe 33, with respect to the length direction of the unit boom 31, the pipe 33 extending in the boom width direction (right and left direction in FIG. 10) to interconnect the pair of support pillars 32. The addition of such dedicated pipes 34 involves a remarkable increase in the mass and cost of the boom. Moreover, the reference example involves the intersection of the stay rope 6 with the pole 2 when viewed along the boom width direction (depth direction in FIG. 9), which requires the boom stay rope 6 to be offset from the pole 2 in the width direction, whereas the structure shown in FIG. 3 does not require the shift.

Figure 5:
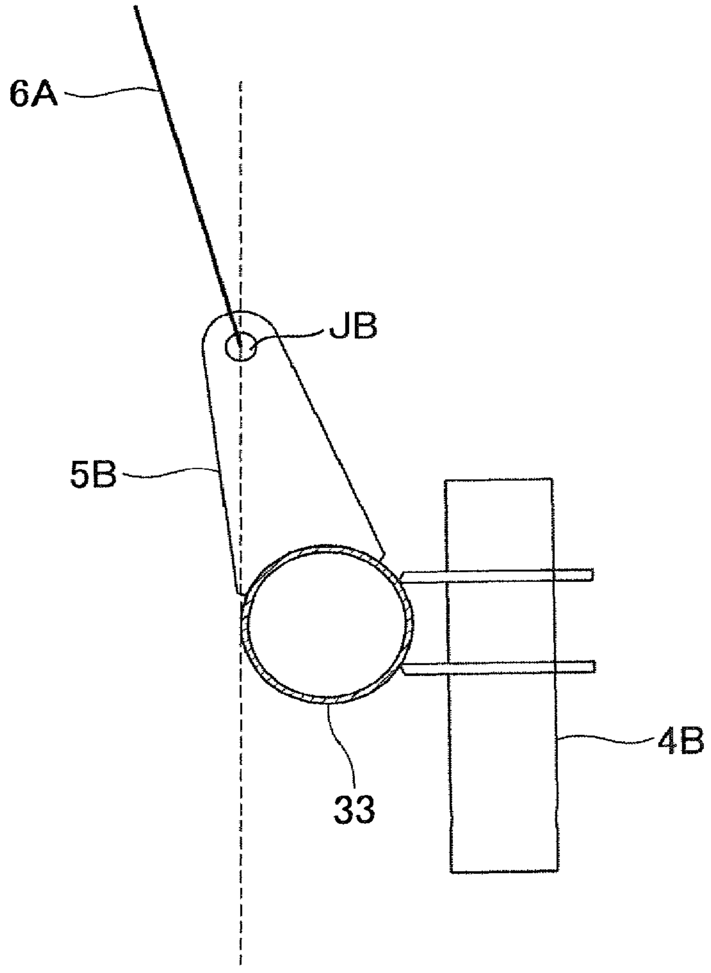
FIG. 5 is a partial cross-sectional side view of the part enclosed by a broken line V in FIG. 3.

Besides, as shown in FIG. 5 which is a side view of the part enclosed by the broken line V in FIG. 3, the structure shown in FIG. 3 includes the coincidence of the length direction of the second connection member 5B (the direction in which a second joint JB, at which the second connection member 5B and the first stay rope 6A are interconnected, and the axis of the pipe 33 selected as the first fixation member are interconnected) with the direction in which the first stay rope 6A is stretched, and, similarly, the coincidence of the length direction of the first connection member 5A (the direction in which the first joint JA, at which the first connection member 5A and the second stay rope 6B are interconnected, and the axis of the pipe 33 selected as the first fixation member are interconnected) with the direction in which the second stay rope 6B is stretched. These coincidences enable respective tensions of the first and second stay ropes 6A, 6B to be transmitted to the second and the first fixation members (the pipe 33 in FIG. 5) with high efficiency via the second and the first connection members 5B, 5A, respectively.

As shown in FIG. 5, the second joint JB (the point where the second connection member 5B and the first stay rope 6A are connected to each other) is set at a position where the second joint JB is aligned in the pole direction (vertical direction in FIG. 5) with one end of the opposite ends of the outer periphery of the pipe 33 (second pipe) used as the second fixation member, with respect to the boom length direction, the one end being on the side closer to the first unit boom 31A (the left side in FIG. 5), that is, a position equivalent to that of the one end with respect to the boom length direction. This allows a second protruding length, which is the length by which the second connection member 5B protrudes in the boom length direction beyond the second unit boom 31B, to be small.

Similarly, setting the first joint JA (the point where the first connection member 5A and the second stay rope 6B are connected to each other) shown in FIG. 3 to a position where the first joint JA is aligned in the pole direction with one end of the opposite ends of the outer periphery of the first pipe selected among the plurality of pipes 33 included in the first unit boom 31A, with respect to the boom length direction, the one end being on the side closer to the second unit boom 31B (the right side in FIG. 2 and FIG. 3), that is a position equivalent to that of the one end with respect to the boom length direction, allows a first protrusion length, which is the length by which the first connection member 5A protrudes in the boom length direction beyond the first unit boom 31A, to be small. Any of allowing the first protrusion length to be small and allowing the second protrusion length to be small enables the entire boom 14 including the handrail device 1 to have a small size in the boom length direction. This effect can be provided also by locating the second joint JB on the inner side of the second pipe (pipe 33) in the boom length direction than the position of the outer periphery of the pipe 33 shown in FIG. 3 or locating the first joint JA on the inner side of the first pipe in the boom length direction than the position of the outer periphery of the first pipe.

Figure 6:
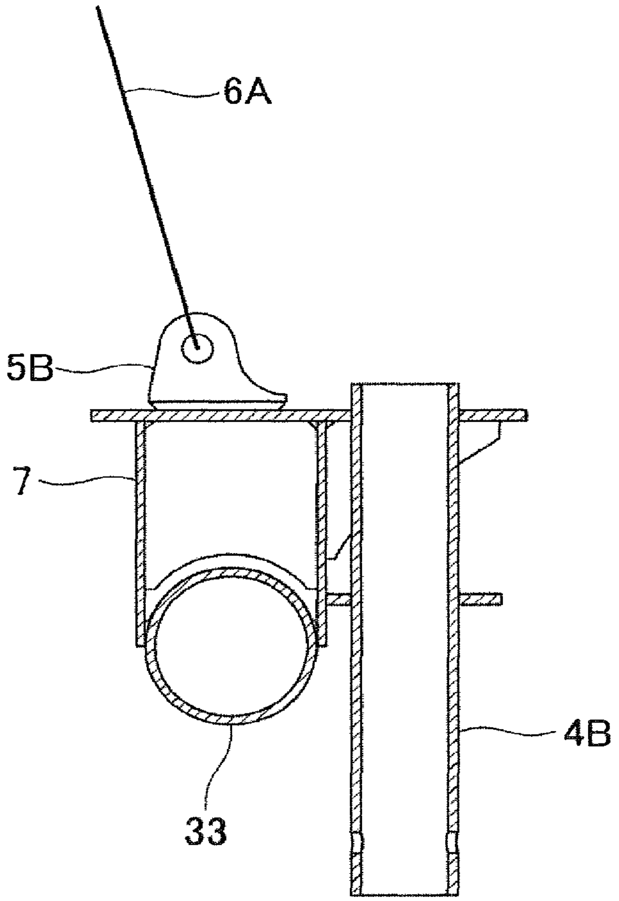
FIG. 6 is a cross-sectional side view showing a part of the handrail device according to a modification, the shown part corresponding to the part enclosed by the broken line V.

FIG. 6 shows a modification of the first embodiment. As shown in FIG. 6, the second pole support member 4B and the second connection member 5B can be integrally joined with each other with no interposition of the pipe 33 as the second fixation member. In the configuration shown in FIG. 6, the second pole support member 4B and the second connection member 5B are integrally joined with each other through an intermediate member 7, which is fixed to a pipe 33 as a second fixation member, by bolts or welding. Each of the second pole support member 4B and the second connection member 5B are fixed to the intermediate member 7 by bolts or welding. The second pole support member 4B and the second connection member 5B, therefore, are fixed to the common second fixation member, namely, the pipe 33, through the intermediate member 7.

The thus integrally interjoined second pole support member 4B and the second connection member 5B can be attached to the second fixation member, for example, the pipe 33 at one time, thereby allowing man-hours and cost to be reduced. Besides, the tension of the second stay rope 6B, directly transmitted to the second pole support member 4B through the second connection member 5B, can be restrained from acting locally on the pipe 33 as the second fixation member. The above effect can be similarly provided also by integrally joining the first pole support member 4A and the first connection member 5A with each other with no interposition of the first fixation member.

Next will be described a handrail device 101 according to the second embodiment of the present invention with reference to FIGS. 7 and 8. The configuration common to the first embodiment and the effects achieved by the same are omitted, and the points different from those of the first embodiment will be mainly described. The same members as those of the first embodiment are denoted by the same reference numerals as those of the first embodiment.

Figure 7:
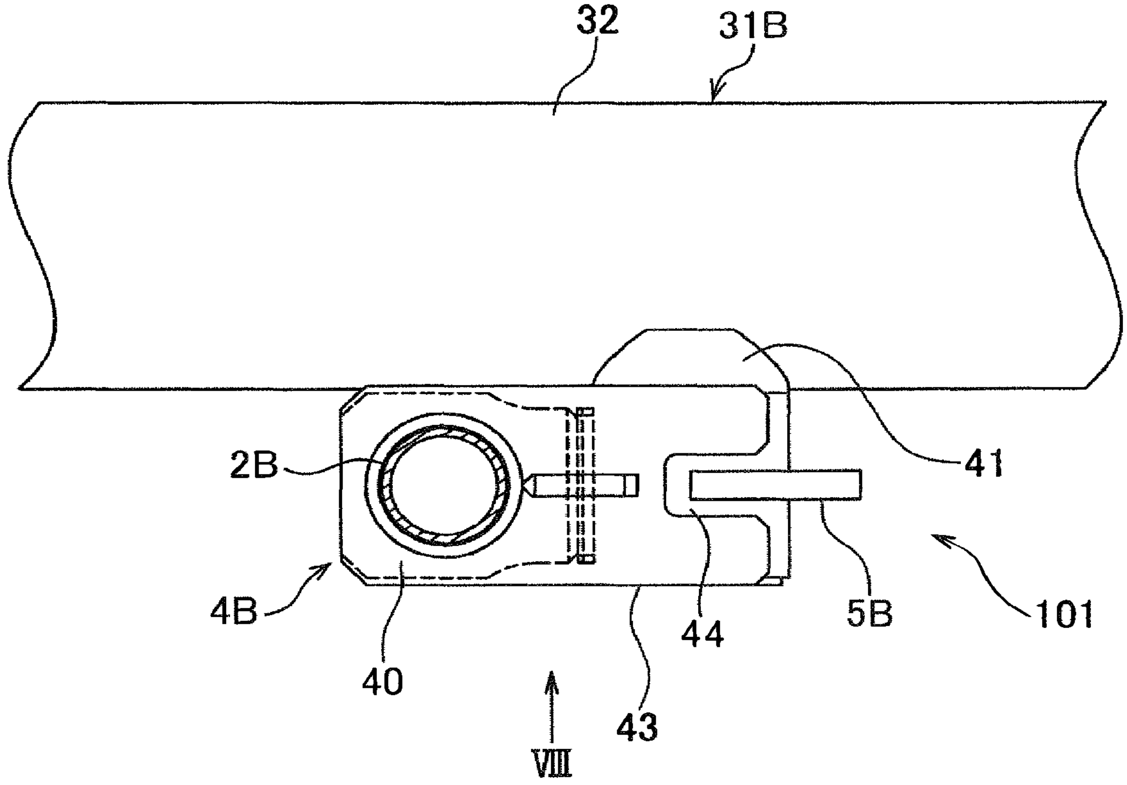
FIG. 7 is a partial cross-sectional plan view of an end of a unit boom according to a second embodiment of the present invention.

FIG. 7 is a plan view showing an end of a second unit boom 31B, with respect to the boom width direction, in a boom provided with the handrail device 101. As shown in FIG. 7, the handrail device 101 includes a second pole support member 4B and a second connection member 5B, which are attached to the second unit boom 31B and fixed to a specific support pillar (for example, a lower right support pillar) 32 out of a plurality of support pillars 32 constituting the second unit boom 31B. In short, the specific support pillar 32 is selected as a second fixation member in the second embodiment.

Specifically, the second pole support member 4B includes a first mounting part 41, a second mounting part 42 and a third mounting part 43, in addition to a support member body 40 that supports the second pole 2B, and the first mounting part 41 is fixed to the support pillar 32 whereby the support member body 40 is attached to the support pillar 32 through the first to third mounting parts 41 to 43.

Figure 8:
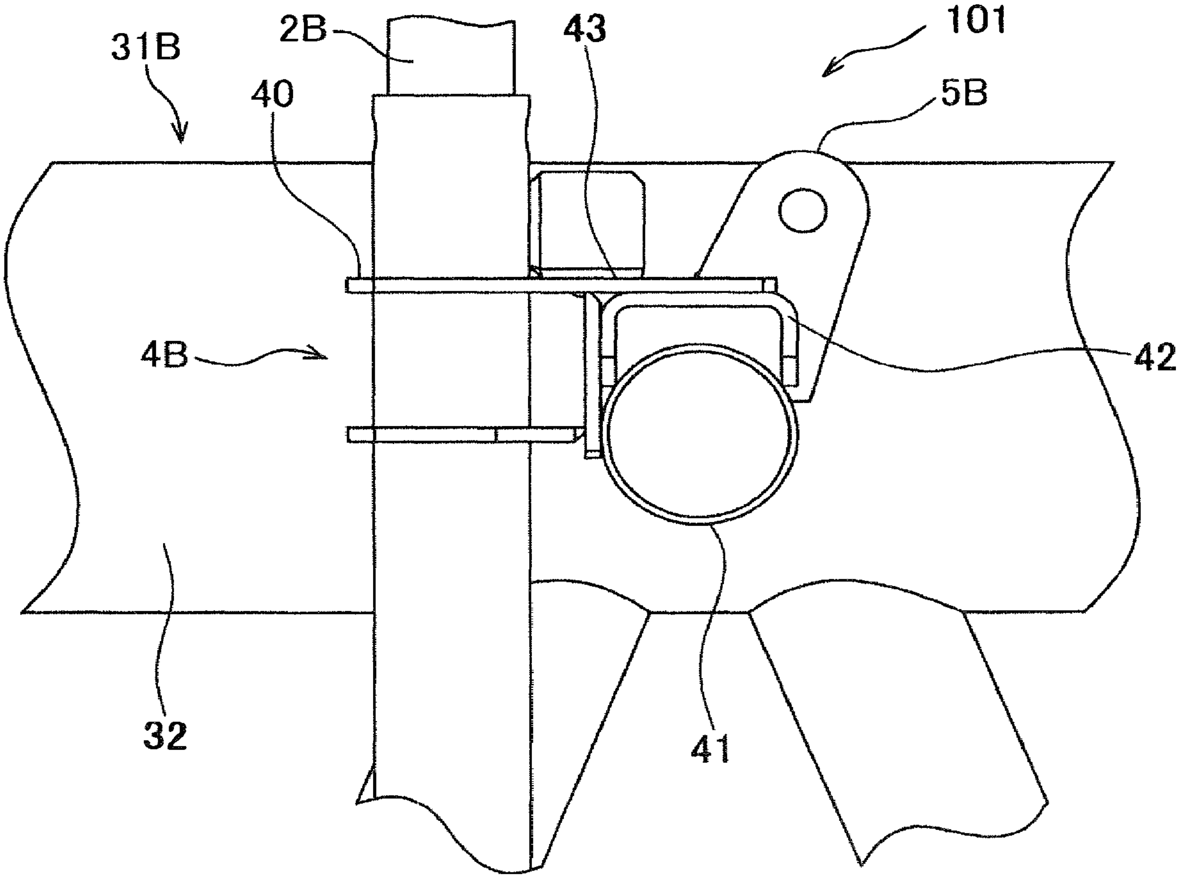
FIG. 8 is a side view as viewed in a direction indicated by an arrow VIII in FIG. 7.

The first mounting part 41 has a cylindrical shape as shown in FIG. 8, and is fixed to a side surface of the support pillar 32 by bolts or welding. The second mounting part 42 has a cross-sectional shape including a top wall and a pair of side walls extending downward from opposite ends of the top wall in the width direction, that is, a cross-sectional shape opened downward, wherein respective lower ends of the pair of side walls are fixed to the upper part of the first mounting part 41 by bolts or welding, as shown in FIG. 8. The second connection member 5B is fixed to the upper surface of the second mounting part 42 by bolts or welding.

The third mounting part 43 is a flat-plate shaped extension part from the support member body 40 in a boom length direction (right and left direction in FIG. 7 and FIG. 8). Each of the second and third mounting parts 42, 43 is formed with a notch 44 as shown in FIG. 7 to avoid interference with the second connection member 5B. As shown in FIG. 8, the second and third mounting parts 42, 43 are vertically connected to each other by bolts or welding. This allows the support member body 40 to be fixed to the support pillar 32 through the third mounting part 43, the second mounting part 42 and the first mounting part 41 in this order, and allows the second connection member 5B to be fixed to the support pillar 32 through the first mounting part 41.

The support member body 40 and the first to third mounting parts 43 which constitute the second pole support member 4B may be entirely composed of a single member or may include a specific part which can be connected to the other part by bolts or the like to be capable of being disassembled. In the former case, the entirely integrally formed second pole support member 4B can be attached to the second unit boom 31B at once. In the latter case, it is possible that the support member body 40 and the first to third mounting parts 43 are assembled in advance to form the second pole support member 4B and then the thus formed second pole support member 4B is attached to the second unit boom 31B, or it is also possible that only a specific part of the support member body 40 and the first to third mounting parts 43 is attached to the second unit boom 31B in advance and then the other part is attached to the specific part.

The above-described structure can be similarly applied to a not-graphically-shown first unit boom. Specifically, it is possible to select, as the first fixation member, a specific support pillar corresponding to the support pillar 32 among a plurality of support pillars and pipes of the first unit boom, and to fix both the first pole support member and the first connection member to the specific support pillar.

The handrail device 101 according to the second embodiment is also capable of reducing the number of members that is required to have sufficient strength, as compared with the above reference example, in which the dedicated pipe 34 for fixing the connection member 5 is attached to the first unit boom 31A or the second unit boom 31B at a position different from that of the pipe 33 that interconnects the pair of support pillars 32.

Similarly to the first embodiment, the second connection member 5B according to the second embodiment is also disposed at a position closer to the end of the second unit boom 31B with respect to the boom length direction than the second pole support member 4, that is, at a position closer to the first unit boom 31A, thereby enabling the interference between the first stay rope and the second pole 2B to be easily avoided. Similarly, the first connection member is disposed at a position closer to the end of the first unit boom with respect to the boom length direction than the first pole support member, that is, at a position closer to the second unit boom, thereby enabling the interference between the second stay rope and the first pole to be easily avoided.

Besides, similarly to the first embodiment, the length direction of the second connection member 5B according to the second embodiment coincides with the direction in which the first stay rope is stretched. This enables the tension of the first stay rope to be transmitted to the support pillar 32 with high efficiency through the second connection member 5B. Similarly, the coincidence of the length direction of the first connection member with the direction in which the second stay rope is stretched enables the tension of the second stay rope to be transmitted to the support as the first fixation member with high efficiency through the first connection member.

Although the embodiments of the present invention have been described above, specific examples are merely illustrative, and the present invention is not particularly limited, and specific configurations and the like can be modified as appropriate. The actions and effects described in the embodiments of the present invention are not limited to those described in the embodiments of the present invention, and the effects and effects of the present invention are not limited to those described in the embodiments of the present invention.

As described above, there are provided a handrail device capable of having high strength without significantly increasing the mass and cost of a boom, and a work machine provided with the same.

Provided is a handrail device to be provided in a boom included in a work machine. The boom includes a plurality of unit booms to be connected to each other in a state of being aligned in a boom length direction that is a length direction of the boom, and the plurality of unit booms include a first unit boom and a second unit boom that are adjacent to each other in the boom length direction. Each of the first unit boom and the second unit boom includes a right support pillar and a left support pillar which are spaced in a boom width direction which is a width direction of the boom, the width direction being orthogonal to the boom length direction, each of the right support pillar and the left support pillar extending in the boom length direction, and a plurality of pipes which extend in the boom width direction between opposite ends of the right support pillar in the boom length direction and opposite ends of the left support pillar in the boom length direction, respectively, to interconnect the right support pillar and the left support pillar. The handrail device includes: a pair of first poles spaced in the boom length direction in the first unit boom and extending from the first unit boom in a pole direction orthogonal to each of the boom length direction and the boom width direction; a pair of second poles spaced in the boom length direction in the second unit boom and extending from the second unit boom in the pole direction; a first main rope stretched between the pair of first poles; a second main rope stretched between the pair of second poles; a first pole support member fixed to a first fixation member selected among the right support pillar, the eft support pillar and the plurality of pipes of the first unit boom and supporting a first pole that is closer to the second unit boom among the pair of first poles; a second pole support member fixed to a second fixation member selected among the right support pillar, the left support pillar, and the plurality of pipes of the second unit boom and supporting a second pole that is closer to the first unit boom among the pair of second poles; a first connection member fixed to the first fixation member; a second connection member fixed to the second fixation member; a first stay rope stretched between the first pole supported by the first pole support member and the second connection member; and a second stay rope stretched between the second pole supported by the second pole support member and the first connection member.

In this handrail device, fixing the first pole support member for supporting the first pole and the first connection member to which the second stay rope is connected to the common first fixation member and fixing the second pole support member for supporting the second pole and the second connection member to which the first stay rope is connected to the common second fixation member enable the handrail device to have high strength without significantly increasing the mass and cost of the boom. Reducing the increase in the mass of the boom enables the boom to have improved capacity of lifting the suspended load and to be raised with reduced load. Besides, it also enables high safety to be secured even when operators fall from the first and second unit booms, respectively, at the same time.

It is preferable that the first pole support member and the first connection member are integrally joined with each other. This enables the first pole support member and the first connection member to be attached to the first fixation member at one time. Similarly, it is preferable that the second pole support member and the second connection member are integrally joined with each other. This enables the second pole support member and the second connection member to be attached to the second fixation member at one time. Thus allowed are man-hours and cost.

The first connection member is preferably disposed at a position closer to the second unit boom than the first pole support member. This enables the second stay rope connected to the first connection member and the second pole supported by the first pole support member to be easily prevented from interference with each other. Similarly, the second connection member is preferably disposed at a position closer to the first unit boom than the second pole support member. This enables the first stay rope connected to the second connection member and the second pole supported by the second pole support member to be easily prevented from interference with each other.

The first connection member preferably has a length direction that coincides with a direction in which the second stay rope is stretched. This enables the tension of the second stay rope to be transmitted to the first fixation member through the first connection member with high efficiency. Similarly, the second connection member preferably has a length direction that coincides with a direction in which the first stay rope is stretched. This enables the tension of the first stay rope to be transmitted to the second fixation member through the second connection member with high efficiency.

In the case where the first fixation member is a first pipe that is selected among the plurality of pipes included in the first unit boom, a first joint at which the first connection member and the second stay rope are connected to each other is preferably located at a position equivalent to one end of opposite ends of the outer periphery of the first pipe, the one end being closer to the second unit boom than the other end of the outer periphery or at a position on an inner side of the one end in the first pipe. This allows the first connection member to have a reduced first protrusion length by which the first connection member protrudes from the first unit boom in the boom length direction. Similarly, in the case where the second fixation member is a second pipe that is selected among the plurality of pipes included in the second unit boom, a second joint at which the second connection member and the first stay rope are connected to each other is preferably located at a position equivalent to one end of opposite ends of the outer periphery of the second pipe, the one end being closer to the first unit boom than the other end of the outer periphery of the second pipe, or at a position on an inner side of the one end in the second pipe. This allows the second connection member to have a reduced second protrusion length by which the second connection member protrudes from the second unit boom in the boom length direction. Each of reducing the first protrusion length and reducing the second protrusion length allows the entire boom including the handrail device to have reduced dimension in the boom length direction.

Also provided is a work machine including the boom and the handrail device that are described above.

The invention claimed is:

1. A handrail device to be provided in a boom included in a work machine, the boom including a plurality of unit booms to be connected to each other in a state of being aligned in a boom length direction that is a length direction of the boom, the plurality of unit booms including a first unit boom and a second unit boom that are adjacent to each other in the boom length direction, each of the first unit boom and the second unit boom including a right support pillar and a left support pillar which are spaced in a boom width direction which is a width direction of the boom, the width direction being orthogonal to the boom length direction, each of the right support pillar and the left support pillar extending in the boom length direction, and a plurality of pipes which extend in the boom width direction between opposite ends of the right support pillar in the boom length direction and opposite ends of the left support pillar in the boom length direction, respectively, to interconnect the right support pillar and the left support pillar, the handrail device comprising:

a pair of first poles spaced in the boom length direction in the first unit boom and extending from the first unit boom in a pole direction orthogonal to each of the boom length direction and the boom width direction;

a pair of second poles spaced in the boom length direction in the second unit boom and extending from the second unit boom in the pole direction;

a first main rope stretched between the pair of first poles;

a second main rope stretched between the pair of second poles;

a first pole support member fixed to a first fixation member selected among the right support pillar, the left support pillar and the plurality of pipes of the first unit boom and supporting a first pole that is closer to the second unit boom among the pair of first poles;

a second pole support member fixed to a second fixation member selected among the right support pillar, the left support pillar, and the plurality of pipes of the second unit boom and supporting a second pole that is closer to the first unit boom among the pair of second poles;

a first connection member fixed to the first fixation member;

a second connection member fixed to the second fixation member;

a first stay rope stretched between the first pole supported by the first pole support member and the second connection member; and a second stay rope stretched between the second pole supported by the second pole support member and the first connection member.

2. The handrail device according to claim 1, wherein the first pole support member and the first connection member are integrally joined with each other.

3. The handrail device according to claim 1, wherein the second pole support member and the second connection member are integrally joined with each other.

4. The handrail device according to claim 1, wherein the first connection member is disposed at a position closer to the second unit boom than the first pole support member.

5. The handrail device according to claim 1, wherein the second connection member is disposed at a position closer to the first unit boom than the second pole support member.

6. The handrail device according to claim 1, wherein the first connection member has a length direction that coincides with a direction in which the second stay rope is stretched.

7. The handrail device according to claim 1, wherein the second connection member has a length direction that coincides with a direction in which the first stay rope is stretched.

8. The handrail device according to claim 1, wherein the first fixation member is a first pipe that is selected among the plurality of pipes included in the first unit boom, and a first joint at which the first connection member and the second stay rope are connected to each other is located at a position equivalent to one end of opposite ends of an outer periphery of the first pipe, the one end being closer to the second unit boom than the other end of the outer periphery of the first pipe, or at a position on an inner side of the one end in the first pipe.

9. The handrail device according to claim 1, wherein the second fixation member is a second pipe that is selected among the plurality of pipes included in the second unit boom, and a second joint at which the second connection member and the first stay rope are connected to each other is located at a position equivalent to one end of opposite ends of the outer periphery of the second pipe, the one end being closer to the first unit boom than the other end of the outer periphery of the second pipe, or at a position on an inner side of the one end in the second pipe.

10. A work machine comprising:

a boom capable of being raised and lowered; and the handrail device according to claim 1.

* * * * *